F. A. MARTOCCIO.
SELF SEATING PISTON FOR MACARONI PRESSES.
APPLICATION FILED JAN. 31, 1910.
988,007.
Patented Mar. 28, 1911.
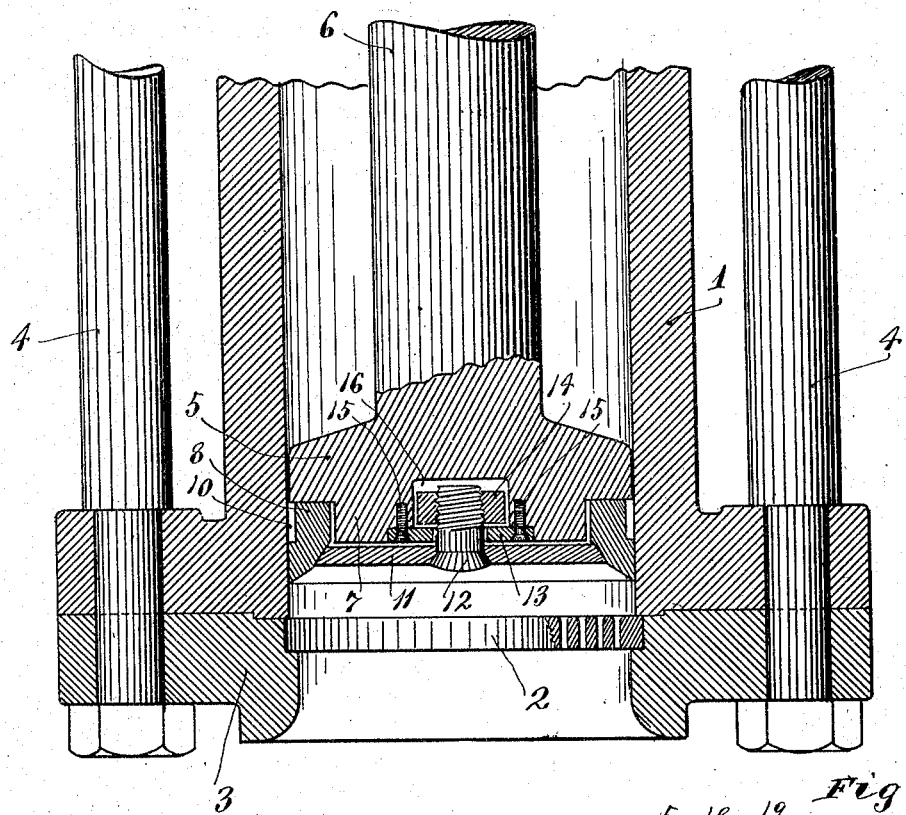
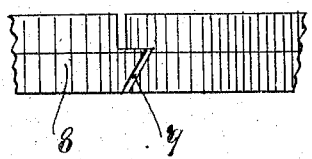
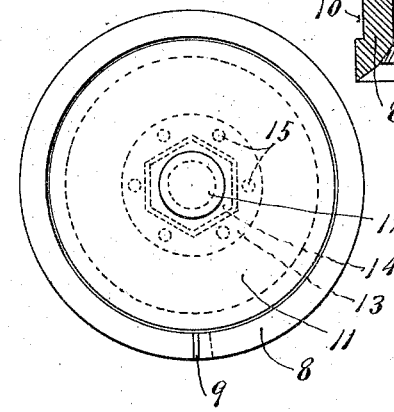
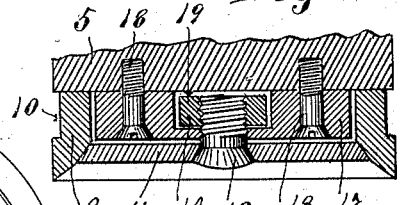
Witnesses
A. H. Opsahl.
L. L. Simpson.
Inventor
F. A. Martoccio
By his Attorneys
Williamson Merchant

UNITED STATES PATENT OFFICE.

FRANK A. MARTOCCIO, OF MINNEAPOLIS, MINNESOTA.

SELF-SEATING PISTON FOR MACARONI-PRESSES.

988,007.  Specification of Letters Patent.  Patented Mar. 28, 1911.

Application filed January 31, 1910. Serial No. 540,962.

*To all whom it may concern:*

Be it known that I, FRANK A. MARTOCCIO, a citizen of the United States, residing at Minneapolis, in the county of Hennepin and State of Minnesota, have invented certain new and useful Improvements in Self-Seating Pistons for Macaroni-Presses; and I do hereby declare the following to be a full, clear, and exact description of the invention, such as will enable others skilled in the art to which it appertains to make and use the same.

My invention has for its especial object to improve the construction of macaroni presses and analogous machines, and is directed to the improvement of the construction of the piston head of the press, whereby a perfectly tight joint is maintained between the cylinder and the piston.

To the above ends, the invention consists of the novel devices and combinations of devices hereinafter described and defined in the claims.

In presses of the type above identified, the cylinder of the press is provided, at its lower end, with a perforated head or die plate, through which the dough to form the macaroni or spaghetti is forced under very great pressure by the downward movement of the press piston which works within the cylinder. Because of the very high pressure to which the dough is subjected, it has hitherto been practically impossible to prevent the leakage of a very considerable amount of the dough operated between the piston and the cylinder under the downward movement of the piston. This leakage is not only wasteful of the dough but it causes the machine to be daubed up to such an extent that considerable time is consumed as preparatory to each recharge of the cylinder with dough, and cleaning the machine of the wasted dough.

My invention provides an extremely simple and efficient piston packing which, under the downward or operative movement of the piston, will be automatically seated against the walls of the cylinder under a pressure which is proportionate to the pressure to which the dough is subjected by the piston.

In the accompanying drawings which illustrate the invention, like characters indicate like parts throughout the several views.

Referring to the drawings, Figure 1 is a view in vertical section, some parts being broken away and some parts in full, showing the lower portion of a macaroni press having my invention applied to the piston thereof; Fig. 2 is a bottom plan view of the piston removed from the cylinder; Fig. 3 is a side elevation, showing a portion of the expansible packing ring of the piston; and Fig. 4 is a fragmentary view in vertical section, showing a slightly modified form of the piston attachment.

Of the parts of the press, the numeral 1 indicates the cylinder, to the lower end of which a perforated die plate 2 is rigidly but detachably held by an annular clamping frame 3 which, in turn, is rigidly but detachably secured to the flanged lower end of the cylinder by the nut-equipped lower ends of depending anchor rods 4. The above noted parts are those of a standard or well-known macaroni press and, so far as my invention is concerned, may take various forms. The piston 5, which works within the cylinder, is rigidly secured to the lower end of a heavy stem 6, the upper end of which, in a standard macaroni press, is connected to gears which impart vertical reciprocal movements thereto and to the piston; and, furthermore, permit the piston to be raised entirely out of the cylinder and swung to one side thereof to permit the required introduction of dough into the cylinder.

In the construction shown in Fig. 1 the lower end portion of the piston 5 is reduced at 7 to form a seat for an expansible packing ring 8. This packing ring 8 is preferably made of spring tempered steel and is made expansible by a lap joint 9. It loosely surrounds the reduced hub portion 7 of the piston but is tightly seated against the lower face of the piston rim. Adjacent to the rim of the piston, the packing ring 8 is reduced in diameter to form a shouldered peripheral chamber or cavity 10. The inner surface of the packing ring 8, below the hub portion 7 of the piston, is beveled or made conical for engagement with the correspondingly formed periphery of a disk-like presser plate 11. The presser plate 11 is loosely held in working position preferably by a screw 12 applied to the center thereof, passed through a centrally perforated keeper plate 13 and provided with a nut 14. The keeper plate 13 is secured to the piston 5 preferably by screws 15, and the nut 14 fits loosely within a cavity 16 formed in the piston.

The construction illustrated in Fig. 4 is substantially the same as that shown in Fig. 1, but it is probably better adapted for application to old pistons or to the pistons of the presses already in use. In this modified construction, instead of turning down the end of the piston to form the hub portion 7, a supplemental hub portion 17 is rigidly but detachably secured to the piston 5 by screws 18 and is provided with a recess 19, in which the nut 14 is seated, the screw 12 being passed through a perforation in the central portion of the said member 17.

With the construction above described, it is evident that, when the piston is forced downward onto the dough, the presser plate 11 will be in direct contact with the upper portion of the dough and the pressure thereon will expand in the packing ring 8 and force the same against the walls of the cylinder under a pressure which will be proportional to the pressure put upon the dough. Otherwise stated, the greater the pressure to which the dough is subjected, and, hence, the greater the tendency of the dough to escape, the greater will be the pressure of the packing against the cylinder, and, hence, the impossibility of any escape of the dough. In fact, in practice, it has been found that, under the downward movement of the piston, there will be very little, if any, escape of the dough at the joint between the cylinder and the piston, and any slight film of dough which may escape will, under the upward movement of the piston and the cylinder, be scraped into the peripheral cavity 10 of the ring 8, so that it may be very quickly and easily removed when the piston is moved out of the upper end of the cylinder for the purpose of permitting the insertion of another charge of dough into the cylinder. It is important to note that the packing ring 8 fits with considerable play around the hub portion 7 and that the bolt passage in the plate 13 is considerably larger than the bolt 12, so that said packing ring, the presser plate 11 and the bolt 12, when properly set, can accurately center themselves in respect to the cylinder without requiring the piston 5 to be accurately centered or accurately moved in respect to the cylinder. It is further important to note that there is a clearness between the nut 14 and the retaining plate 13 sufficient to permit the clamping plate to drop down slightly and thus relieve the packing ring from an extreme outward pressure under the upward movement of the piston. This feature is important because the piston, while it makes a very slow downward movement, makes a relatively very rapid upward movement.

Actual and continued use of the improved macaroni press has shown a very large saving of dough and a very great saving in time. In fact, the waste of dough has been practically eliminated and the working capacity of the press has been very greatly increased.

It will be noted that the lower interior surfaces of the packing ring 8 is made conical and is brought to a sharp cylinder scraping edge so that all the dough which tends to adhere to the cylinder will, by this scraping, be turned or rolled inward against the press plate 11.

What I claim is:

1. The combination with a cylinder and a piston working therein, of an expansible packing ring and coöperating pressure plate applied to said piston, the said pressure plate having a cam action on said packing ring, serving to press same into engagement with said cylinder, and the said packing ring having a beveled surface projecting both laterally and radially beyond the working face of said pressure plate, and terminating in a scraping edge engageable with said cylinder, substantially as described.

2. The combination with a cylinder and a piston working therein, of an expansible packing ring and coöperating pressure plate applied to said piston, the said pressure plate having a cam action on the said packing ring, serving to press the same into engagement with said cylinder, and the said packing ring and pressure plate being mounted with freedom for common movements in a plane transversely intersecting the axes of said piston, to thereby automatically center themselves in respect to said cylinder irrespective of whether or not the said piston is accurately centered in respect to said cylinder.

3. The combination with a cylinder and a piston working therein, of an expansible packing ring and coöperating pressure plate applied to said piston, the said ring and plate having coöperating conical surfaces, the conical surface of said pressure plate terminating in a sharp edge at the working face thereof, which edge is seated against the conical surface of said ring, substantially as described.

4. The combination with a cylinder and a piston working loosely therein, of an expansible packing ring and coöperating pressure plate applied to the working side of said piston, the said pressure plate having a cam action on said ring serving to force the same into engagement with said cylinder, and the said ring having a projecting edge that scrapes against the cylinder under operative movement of said piston, and having a circumferential clearance groove adjacent to said piston to receive material scraped from said cylinder under the return movement of said piston, substantially as described.

5. The combination with a press cylinder and a piston working therein, of an expansible spring packing ring seated in said piston and engageable with said cylinder, said ring and pressure plate having coöperating conical surfaces, the conical surface of said ring terminating in a sharp cylinder scraping edge projecting both radially and laterally beyond the conical surface of said pressure plate, a screw applied centrally to said plate and movable therewith and extending into a recess in said piston, a nut applied to the inner end of said screw, and a member detachably secured to said piston and holding the said nut interlocked to said piston, the said packing ring, pressure plate, screw and nut being mounted for centering movements in a plane transversely intersecting the axis of said cylinder.

In testimony whereof I affix my signature in presence of two witnesses.

FRANK A. MARTOCCIO.

Witnesses:
H. D. KILGORE,
F. D. MERCHANT.